United States Patent
Midtun et al.

(10) Patent No.: US 8,917,838 B2
(45) Date of Patent: Dec. 23, 2014

(54) DIGITAL MEDIA RECORDING SYSTEM AND METHOD

(75) Inventors: James Dean Midtun, Chandler, AZ (US); Chyi Pin Lim, Chandler, AZ (US)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 13/494,481

(22) Filed: Jun. 12, 2012

(65) Prior Publication Data

US 2013/0329868 A1    Dec. 12, 2013

(51) Int. Cl.
*H04M 11/00*    (2006.01)

(52) U.S. Cl.
USPC .................. 379/93.15; 379/88.14; 379/142.15

(58) Field of Classification Search
USPC ................. 379/88.14, 93.15, 202.01, 142.15; 704/251, 270, 277
See application file for complete search history.

(56) References Cited

U.S. PATENT DOCUMENTS

| | | | |
|---|---|---|---|
| 5,600,756 A * | 2/1997 | Ely | 704/235 |
| 8,280,734 B2 * | 10/2012 | Hyman et al. | 704/235 |
| 8,761,373 B1 * | 6/2014 | Raghavan et al. | 379/265.03 |
| 2006/0003751 A1 * | 1/2006 | Vo | 455/414.1 |
| 2007/0133524 A1 * | 6/2007 | Kwon | 370/356 |
| 2008/0260114 A1 * | 10/2008 | Siminoff | 379/88.14 |
| 2008/0319743 A1 * | 12/2008 | Faisman et al. | 704/235 |
| 2009/0076804 A1 * | 3/2009 | Bradford et al. | 704/203 |
| 2010/0027766 A1 * | 2/2010 | Shin | 379/85 |
| 2011/0099006 A1 * | 4/2011 | Sundararaman et al. | 704/208 |

* cited by examiner

*Primary Examiner* — Simon King

(57) ABSTRACT

A system and method for recording and providing a written transcript of a portion of a media session (e.g., a video or audio conference) are provided. An exemplary system continuously records a media session, allowing one or more users to select segments of the session to store and have transcribed. A copy of the recording and the corresponding transcription may be provided to one or more users.

17 Claims, 4 Drawing Sheets

DIGITAL MEDIA RECORDING SYSTEM AND METHOD

FIELD OF THE INVENTION

The present disclosure generally relates to digital media recording systems and methods. More particularly, the disclosure relates to systems and methods for recording video or audio sessions and storing and transcribing portions of the audio or video recordings.

BACKGROUND OF THE INVENTION

Various techniques for recording video and/or audio material exist. For example, audio information can be recorded digitally and stored as WAV, AIFF, AU, raw, MP3, AAC, or similar file types. Similarly, video recordings may be stored as 3GP, ASF, AVI, MP4, or the like.

Often, during a phone or video conversation, it is desirable to memorialize a portion (e.g., specific information, such as contact information (name, number, address, etc.) or other information) of the conversation. This may be done by, for example, taking notes by hand during the conversation. Unfortunately, the person taking notes may not have much, if any notice, that the information about to be conveyed is important and may therefore miss something. Consequently, the person desiring to memorialize a portion of the session may have to ask for the desired information to be repeated.

Alternatively, a system may be set up to record the entire audio or video session. In this case, a person may review the recording and note the desired information. Unfortunately, it may take an undesirable amount of time to review the session recording to find the desired information.

Therefore, improved systems and methods for memorializing a portion of an audio or video session are desired.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

Figure 1:
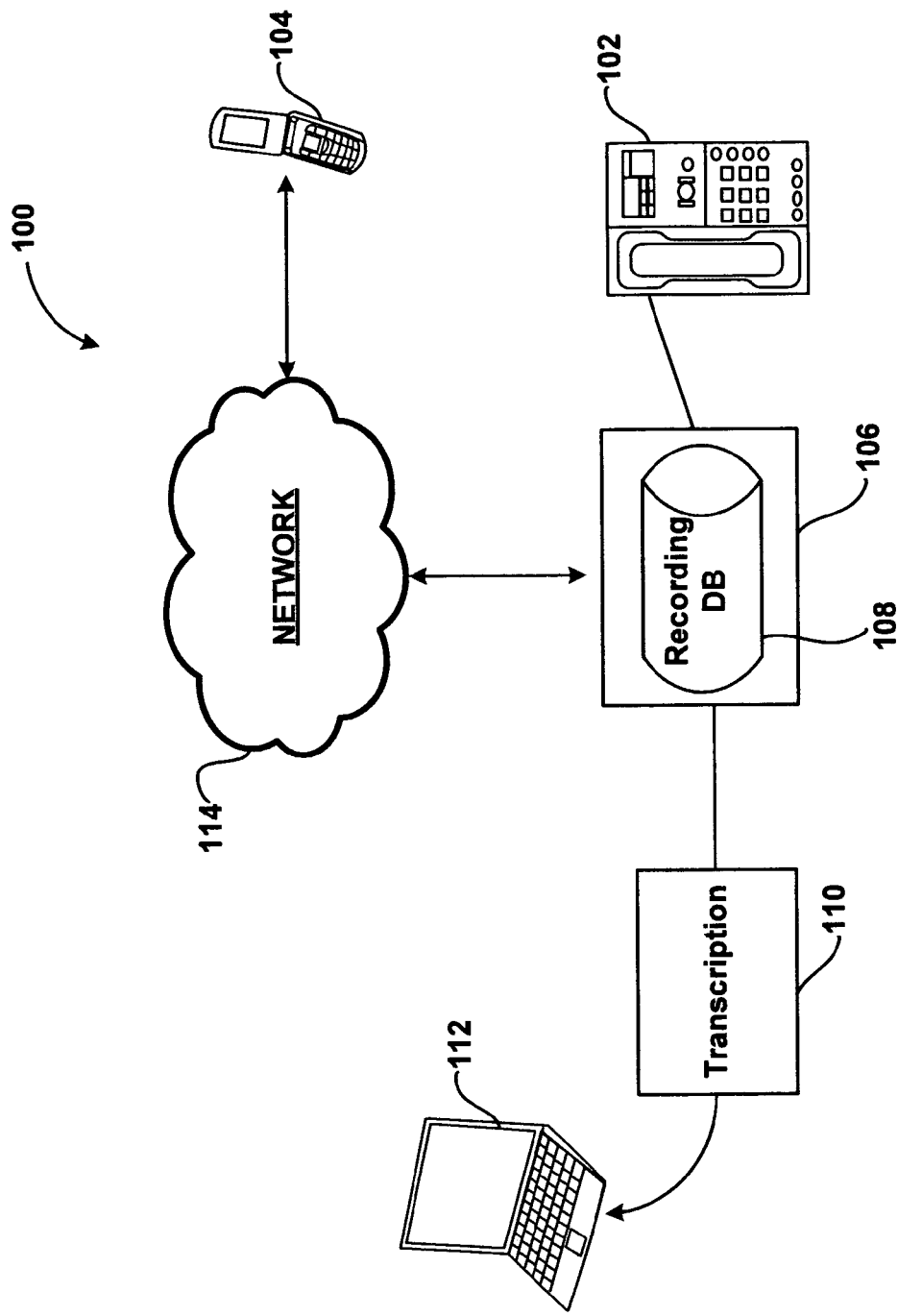
FIG. 1 illustrates a communication system in accordance with various exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The disclosure provides a system and method for recording and providing a corresponding written transcript of a portion of a media session, such as a video or audio conference. The system and method described herein can be used for a variety of applications, such as providing written notes corresponding to a portion of a telephone call between two or more users, providing written notes corresponding to a video conference between two or more users, providing written notes corresponding to a conversation (e.g., a portion of a lecture or talk, which is recorded by a user), or to generate notes corresponding to a previously recorded media session.

By way of example, the system and method may be used to produce recorded media (e.g., audio) recordings from a portion or portions of a telephone or video conversation and written notes corresponding to the recorded media. As set forth in more detail below, in accordance with various exemplary embodiments, the system is configured to continually record a conversation and digitally store a portion of the conversation (e.g., a predetermined duration of the conversation), such that if a user indicates a desire to memorialize the recording and generate corresponding notes or if an automatic trigger is initiated, the system stores the digital recording having a predetermined duration and transcribes the digital recording having a predetermined duration into written notes. The written notes and the corresponding digital recordings or a link to the recordings are then provided to one or more users, or access to the notes and recordings are provided to one or more users. The notes and recordings or links to recordings may be provided by, for example, email, text, real-time display on a user's monitor, application console, or other suitable means. Alternatively, the notes and recordings may be stored and users may be provided access to the recordings and notes. In addition to the recordings and the transcriptions, users may be provided with details regarding the recordings, such as time of the recordings, date of the recordings, users or participants in the conversation, and the like.

Because the system is continually recording, or buffering, and storing a predefined duration of the session, users can listen to a speaker and indicate when to capture and store desired information. Because the entire conversation is not necessarily captured or stored, information that one or more users have indicated as of interest requires less time and resources to store and review, relative to storing and reviewing the entire conversation.

Users may indicate a desire to capture a recording and have notes transcribed by pushing a button or entering a code on a communication device (e.g., a phone, mobile phone, computer, or the like). Alternatively, the system may automatically store recordings and create transcriptions upon recognition of certain sounds, words, or phrases.

The system can be configured to go back in time for a predefined period to capture material already provided and/or configured to capture material that is subsequently provided for a predefined period. Additionally, users may be able to alter the defined length of the stored recording after a call has been initiated. Thus, users can obtain written notes and corresponding recordings for material that has already been provided, or, if a user is aware that he or she may want notes on upcoming material, the system can be used to capture the upcoming material.

FIG. 1 illustrates an exemplary system 100 in accordance with various embodiments of the disclosure. System 100 includes a first communication device 102, a second communication device 104, a recording device 106, a recording database 108, and a transcription device 110. System 100 may also include a third communication device 112 and a network 114. In operation, as users communicate using devices 102, 104, recording device 106 records and stores a predetermined amount of the conversation. If either user indicates that he or she would like a written transcript of a portion of the conversation (e.g., by pressing a button or predefined code on device 102 or 104), the recording of predetermined length is stored in database 108, transcribed by transcription device 110, and may be sent to (e.g., via email or text) or retrieved by (e.g., by going to a website) one or more of the users.

Although illustrated as wired and mobile devices, respectfully, devices 102 and 104, as well as device 112 may be all mobile devices, all stationary or wired devices, or any combination of wired, mobile, and stationary devices and may be connected to network 114 by any suitable wireless or wired medium. Either one or both of devices 102 and 104 as well as device 112 may include smart phones, tablet computers, personal digital assistants, phones, personal computers, or any other device suitable for communication using system 100. By way of examples, device 102 may be a telephone wired to a network, device 104 may be a smartphone running Android™, iOS®, Windows®, Symbian®, Blackberry® OS, Linux® operating systems, or similar operating systems, and device 112 may be a personal computer. System 100 may include any suitable number of devices, which may be coupled to one or more networks 114.

Recording device 106 may include any device capable of capturing audio, and optionally video, communication between device 102 and device 104. By way of example, recording device may include a digital audio recorder, a computer, or the like. During operation of system 100, device 106 continually records audio content between devices 102, 104, and retains a predefined portion (e.g., ten seconds, twenty seconds, thirty seconds, one minute, two minutes, 3 minutes, 4 minutes, 5 minutes or other suitable interval) of the recording. In the illustrated example, recording device 106 is part of or coupled directly to (i.e., no intervening device between the recording device and device 102) device 102. However, the invention is not limited to this exemplary configuration. Furthermore, although only device 102 is illustrated with a recording device, in accordance with various examples, multiple devices 102, 104, 112 may include recording devices, in which case the buffering is done using the respective user's devices.

Device 106 may include a recording database 108, as illustrated, or database 108 may be separate from device 106. Database 108 stores audio recordings of predefined lengths (e.g., audio recordings that one or more users have requested be saved and transcribed). The audio data may be stored in a variety of formations including WAV, AIFF, AU, raw, MP3, AAC, or similar file types if the content is audio only or 3GP, ASF, AVI, MP4, or the like if the content includes video.

Transcription device 110 may be any device capable of converting audio communication to text. Exemplary devices include computers and servers with suitable voice-to-text software. Further, although illustrated as a device separate from recording device 106, devices 106 and 110 may be integrated—i.e., one device may perform both functions.

Network 114 may include a local area network (LAN), a wide area network, a personal area network, a campus area network, a metropolitan area network, a global area network, with different type of mediums (fiber optics, copper, electromagnetic field) or the like. Network 114 may be coupled to devices 102, 104 using an Ethernet connection, other wired connections, a Wi-Fi interface, other wireless interfaces, or the like. Network 114 may be coupled to other networks and/or to other devices typically coupled to networks. By way of one example, network 114 includes a private branch exchange (PBX), which may be coupled to a publically switched telephone network or the internet.

Figure 2:
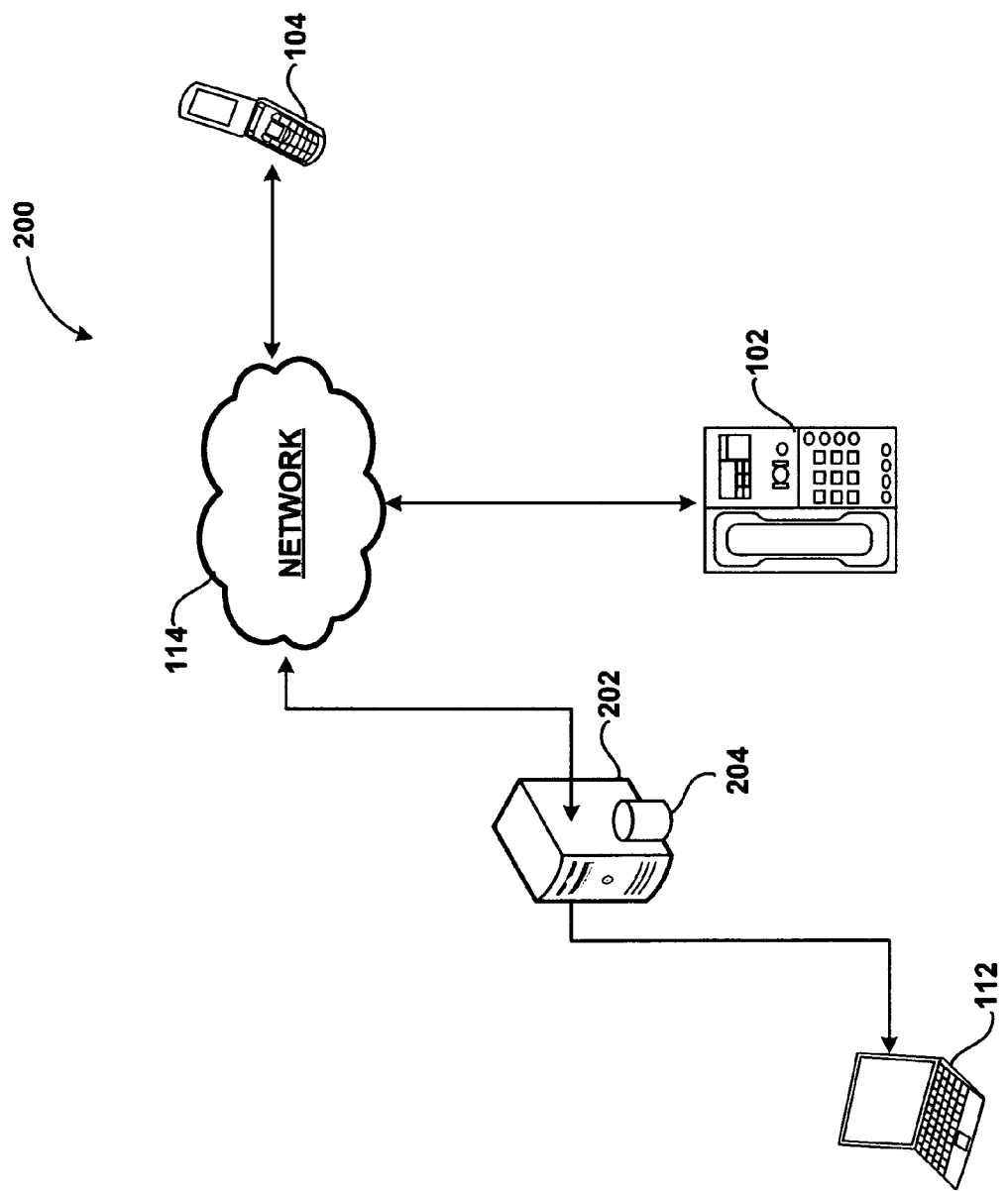
FIG. 2 illustrates a communication system in accordance with additional exemplary embodiments of the disclosure.

FIG. 2 illustrates a system 200 in accordance with additional exemplary embodiments of the disclosure. Similar to system 100, system 200 includes devices 102, 104, 112 coupled to network 114. However, rather than recording device 106 coupled directly to or being integrated with device 102, as illustrated in FIG. 1, system 200 includes a recording and transcription device 202, which is coupled to network 114, and which can be connected to or conferenced to a communication—such as a telephonic communication. In the illustrated example, the recording and transcription operations are performed by device 202; however, in alternative examples, the recording and transcription operations can be performed by separate devices, which are coupled together. Similarly, the recordings and/or transcriptions can be stored in database 204, which can be integrated with device 202 or coupled to device 202. If separate and coupled to device 202, database 204 may suitably form part of network 114—e.g., part of a server of a private branch exchange.

Recording and transcription device 202 may include any of the devices described above in connection with devices 106, 110, and database 204 may be similar to database 108. In accordance with exemplary embodiments, device 202 includes a server capable of recording predefined segments of audio signals transmitted between device 102 and device 104 using network 112 and transcribing the audio recording into written words. In accordance with additional embodiments of the invention, a system may include multiple devices to perform the recording and/or transcription functions.

Figure 3:
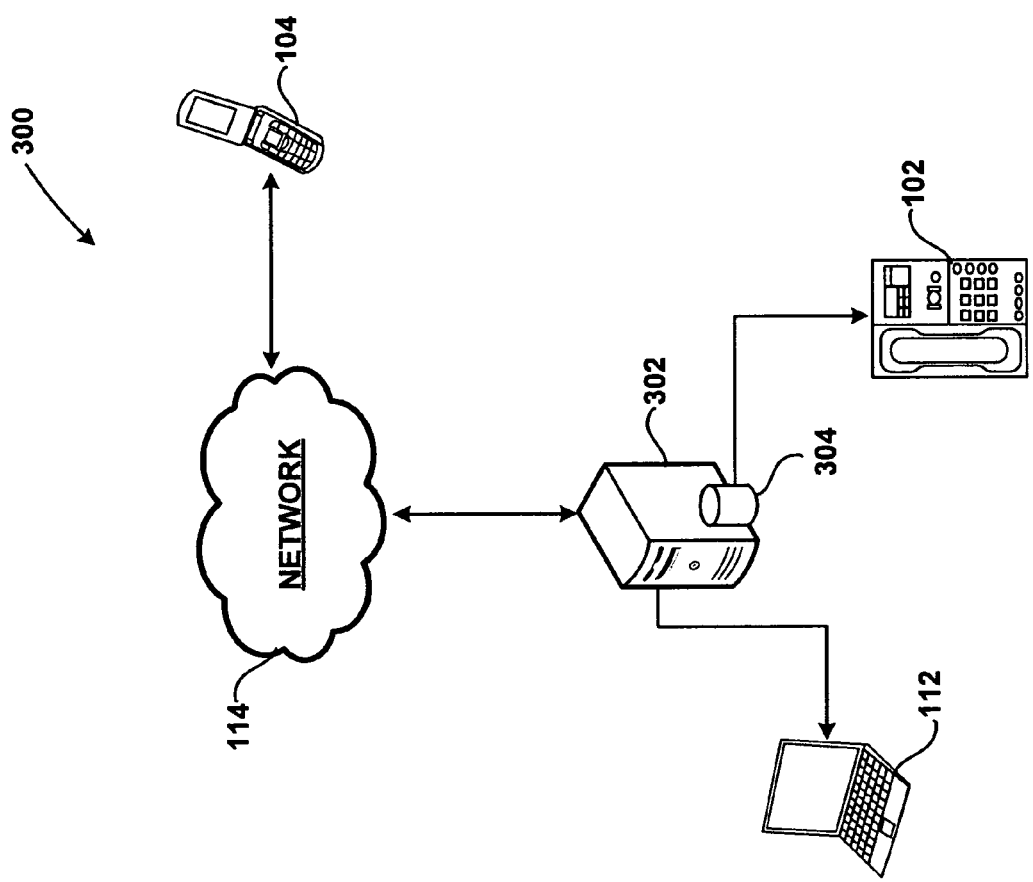
FIG. 3 illustrates a communication system in accordance with yet additional exemplary embodiments of the disclosure.

FIG. 3 illustrates yet another system 300 in accordance with exemplary embodiments of the disclosure. System 300 is similar to systems 100 and 200, except system 300 includes a recording and transcription device 302, which is interposed between network 114 and device 102, such that communication between device 102 and device 104 flows through device 302, and a database 304 coupled to device 302. Database 304 may be the same or similar to database 108 or 204, and may be part of device 302 or separately coupled to device 302.

Although illustrated with a single transcription and recording device, system 300 may alternatively include separate recording and transcription device(s), which are coupled together. Similarly, although illustrated with device 302 between network 114 and device 102, device 302 may be between any device (e.g., device 104 and/or 112) or between multiple devices and network 114.

Figure 4:
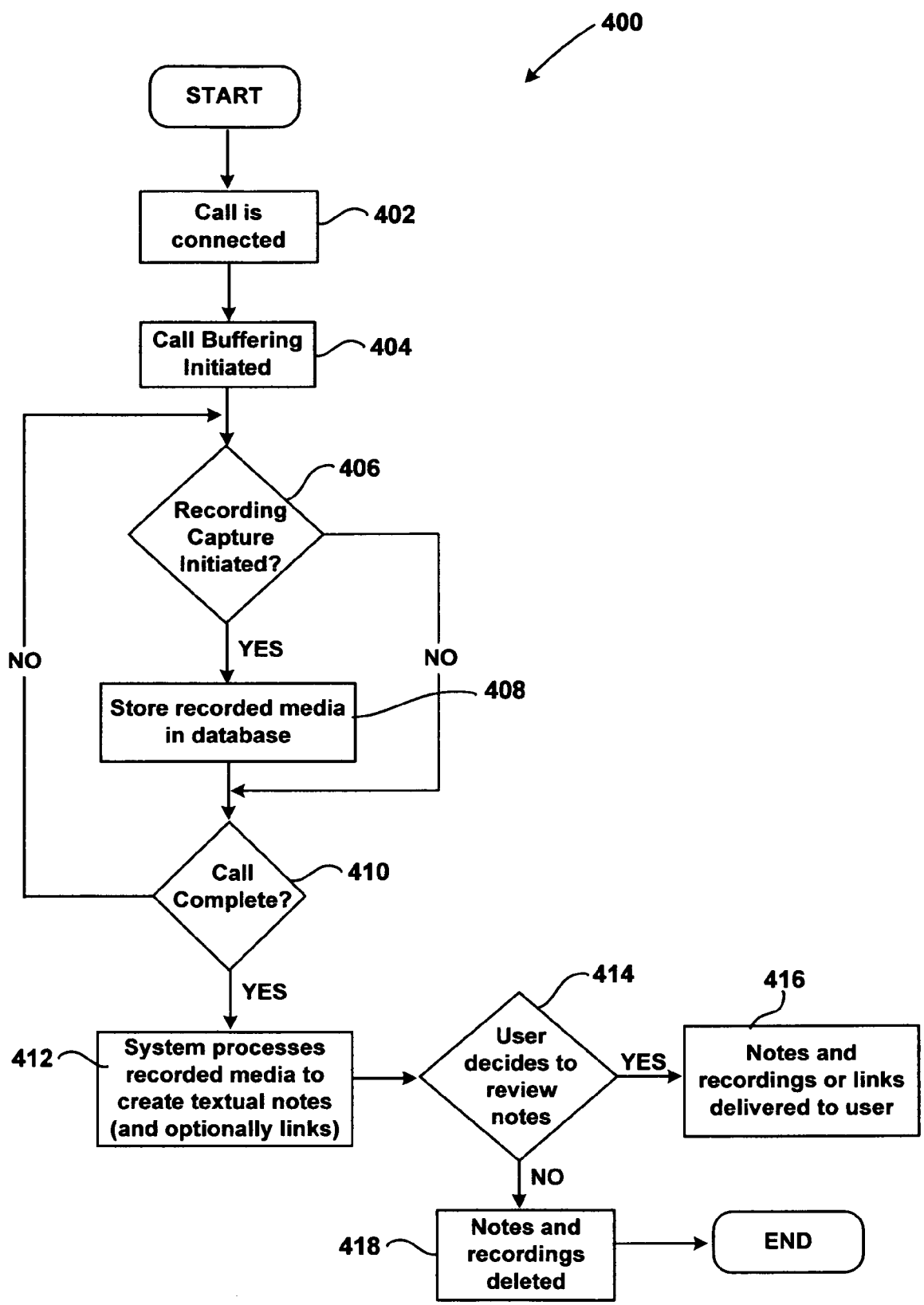
FIG. 4 illustrates a method of recording a portion of a media session and generating notes corresponding to the recording in accordance with yet additional exemplary embodiments of the disclosure.

Turning now to FIG. 4, a method 400 for digital media recording is illustrated. Method 400 includes the steps of connecting or initiating a call (step 402), continuously buffering or recording the call (step 404), determining whether recording capture is initiated (step 406), if recording capture was initiated, storing recorded media in a database (step 408), determining whether the call is complete (step 410), if the call is complete, creating written text corresponding to the audio recording captured during step 408 (step 412). After the notes are generated, a user decides whether to review the notes (step 414). If the user decides to review the notes, the notes and corresponding link or recording are delivered to the user (step 416). If the user decides to not review the notes, the notes and recordings may be deleted (step 418).

During step 402, a call is initiated and connected. The call may be a public switched telephone network call, a private branch exchange call, a wireless call, a voice over internet call, the like, or a call between any combinations of such technologies.

Once a call is initiated, a system (e.g., any of systems 100, 200, or 300), begins buffering a predefined length of the conversation (e.g., ten seconds, twenty seconds, thirty seconds, one minute, two minutes, three minutes, etc.), which is long enough to capture the longest user-defined recording segment (e.g., ten seconds, twenty seconds, thirty seconds, one minute, two minutes, three minutes, etc.) of the media session, during step 404, such that when a user invokes the request for recording and transcription, the system has already recorded the information. Alternatively, as noted above, the system may be configured to capture upcoming, as opposed to previous, material, or a combination of previous and upcoming material.

During step 406, one of the users may indicate that he or she wishes to preserve a portion of the conversation and transcribe the recording. The request to save the recording and transcribe may be processed locally on a user's device or on a separate device, such as a computer, server, or a private branch exchange, which may be used to create a conference to a recording server. In accordance with some aspects, the user may indicate a desire to store the recording by pressing a button (e.g., a button on a phone or a visual button on a screen), a menu item, a physical button, or by entering a predefined code onto the user's device (e.g., phone or computer). Alternatively or additionally, the system includes voice recognition, which may automatically trigger storage of the recording. For example, the system may be configured to recognize the words "phone," "address," "note this," or other suitable words or phrases and upon recognition of such terms, retain the corresponding audio recording for the predefined duration during step 408. In this case, the recording device (e.g., device 106, 202, or 302) includes software to monitor the media stream between the first device and the second device. Moreover, a user who is the speaker can use this feature to use the system to generate notes that could be distributed to one or more users of the system. This automatic feature can be used in conjunction with the manual/user select feature.

Once a user invokes the save recording and generate notes feature (step 406), the recording device saves recorded information, which is stored in a database—e.g., in a database 108, 204, or 304, during step 408. If a user does not indicate a desire to store the recording and the system does not automatically trigger storage, then no information for that communication is retained during step 408.

In accordance with various exemplary embodiments, a method may also include allowing users to select separate feature codes, buttons, menus, or the like to allow a user to choose from storing and transcribing information that was provided, information that is about to be provided, or a combination of information that was provided and information that is about to be provided. For example, a user may select a feature to store information that was previously stated, a combination of information that was previously stated and that will be conveyed during a prescribed time period, or only information that will be conveyed during an upcoming period.

Once the call is completed, step 410, a user decides whether to review notes from the conversation. If the user requesting the notes or all users decide to not review the notes, then the notes and corresponding recordings may be deleted during step 418. If, on the other hand, a user decides to review the notes, then written notes are generated using speech-to-text technology to create a textual representation of the saved recordings. The notes are then stored and linked to the corresponding recording (e.g., in database 108, 204, or 304). The notes and corresponding recordings or links to the recordings are provided to the user requesting the notes during step 416. The recordings (or links) and notes may be provided via email, web console, or the like, or the information may be stored (e.g., in a standard format, such as CSV, XML, or the like) for export to applications, such as Excel®, Word, Evernote®, or the like. Providing access to the corresponding recordings allows a user to verify the text of the notes. In accordance with various aspects of these exemplary embodiments, a user can further determine whether to discard the notes generated during method 400.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

We claim:

1. A communication system comprising:
a first communication device;
a second communication device coupled to the first communication device;
a recording device coupled to the first communication device and the second communication device; and
a transcription device,
wherein the recording device continuously records in a plurality of segments of a predefined length an audio transmission between the first communication device and the second communication device and retains a desired one of the plurality of segments of the audio transmission, and
wherein the transcription device transcribes the desired one of the plurality of segments of the audio transmission into written words when signaled by one of a user of the first communication device or a user of the second communication device.

2. The communication system of claim 1, further comprising a recording database to store the desired one of the plurality of segments of the audio transmission.

3. The communication system of claim 1, wherein the recording device comprises the recording database.

4. The communication system of claim 1, wherein the desired one of the plurality of segments of the audio transmission transcribed is stored in a recording database.

5. The communication system of claim 1, wherein the recording device stores the desired one of the plurality of segments of the audio transmission in a format selected from the group consisting of WAV, AIFF, AU, raw, MP3, AAC, 3GP, ASF, AVI, and MP4.

6. The communication system of claim 1, further comprising a network coupled between the first communication device and the second communication device.

7. The communication system of claim 6, wherein the network comprises a network selected from the group consisting of a local area network, a wide area network, a personal area network, a campus area network, a metropolitan area network, a global area network.

8. The communication system of claim 6, wherein the network comprises a private branch exchange.

9. The communication system of claim 1, wherein the recording device is integrated with the first communication device.

10. The communication system of claim 1, wherein the recording device is directly coupled to the first communication device.

11. The communication system of claim 1, wherein the recording device is conferenced into a call between the first communication device and the second communication device.

12. The communication system of claim 1, wherein the recording device comprises a server.

13. A communication system comprising:
   a first communication device;
   a second communication device coupled to the first communication device; and
   a recording and transcription device coupled to the first communication device and the second communication device,
   wherein the recording and transcription device records an audio transmission in a plurality of segments of a predefined length between the first communication device and the second communication device and stores and transcribes a desired one of the plurality of segments into written words when signaled by a user of the first communication device or the second communication device.

14. The communication system of claim 13, comprising a plurality of recording and transcription devices.

15. The communication system of claim 13, wherein the recording and transcription device continually records audio content between the first communication device and the second communication device during a length of a communication.

16. The communication system of claim 13, wherein the recording and transcription device comprises a server.

17. The communication system of claim 13, wherein the recording and transcription device is coupled between the first communication device and a network.

\* \* \* \* \*